March 14, 1972     D. FREEDMAN ET AL     3,649,557
CENTRIFUGAL MECHANICAL DEFOAMER
Filed Oct. 14, 1969
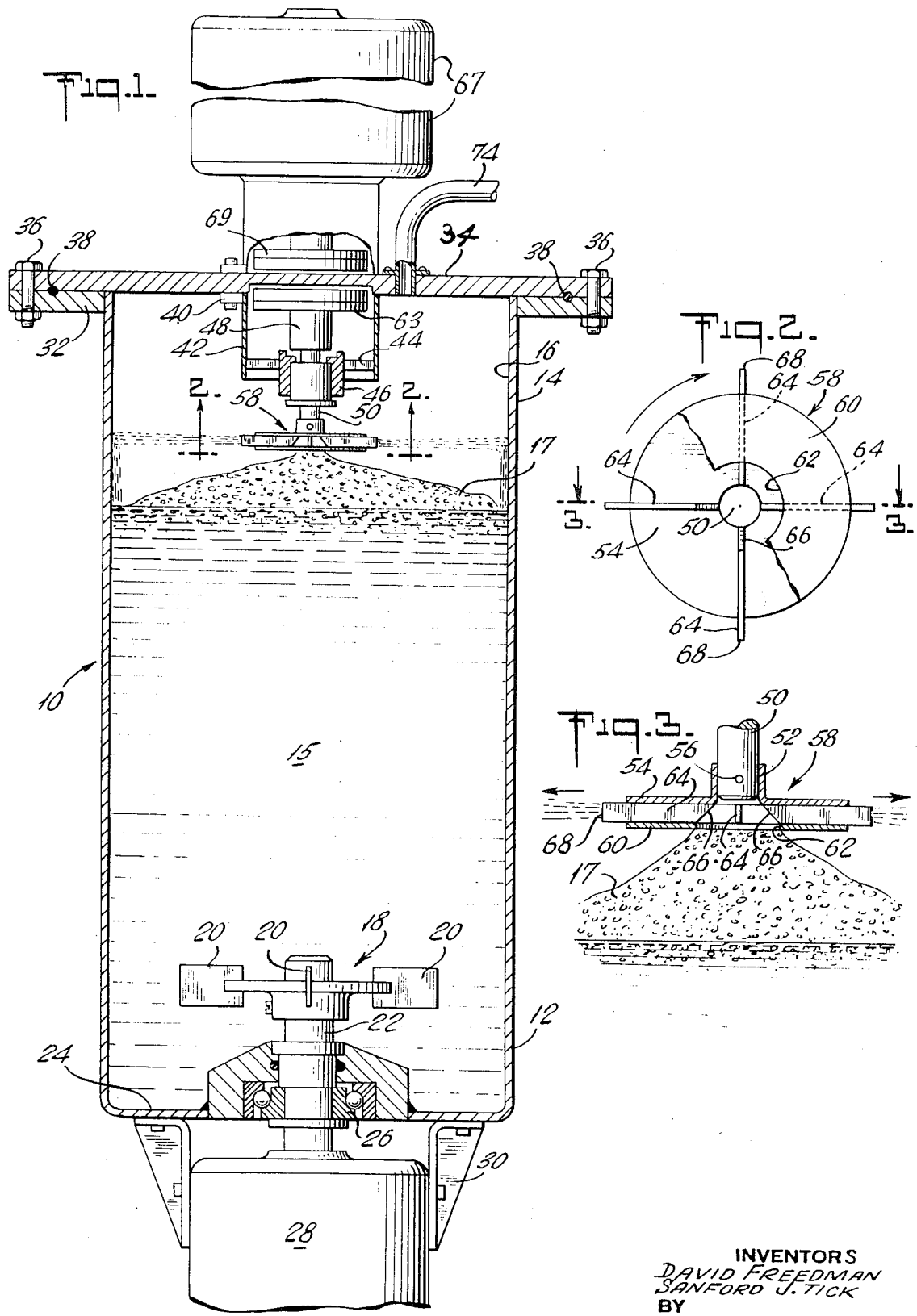
INVENTORS
DAVID FREEDMAN
SANFORD J. TICK
BY
Blum, Moscovitz, Friedman & Kaplan
ATTORNEYS United States Patent Office 3,649,557
Patented Mar. 14, 1972

3,649,557
CENTRIFUGAL MECHANICAL DEFOAMER
David Freedman, Highland Park, and Sanford J. Tick, Millington, N.J., assignors to New Brunswick Scientific Co., Inc.
Filed Oct. 14, 1969, Ser. No. 866,291
Int. Cl. B01d *19/00, 53/06*
U.S. Cl. 252—361        5 Claims

ABSTRACT OF THE DISCLOSURE

A defoamer which breaks up foam by centrifugal, mechanical action. The defoamer includes a vessel having an inner surface which surrounds and defines a foam region where foam will normally be located. Situated in this foam region is a rotary impeller which acts centrifugally on the foam to subject the latter to centrifugal action as well as to impact the foam against the inner surface of the vessel which defines the foam region thereof. As a result of these actions derived from the rotary impeller the foam is broken up into its gaseous and liquid phases, so that the liquid phase can flow back down to a lower liquid region of the vessel while the gaseous phase can escape from the interior of the vessel.

BACKGROUND OF THE INVENTION

The present invention relates to defoamers.

In particular, the present invention relates to a defoamer which will operate by a centrifugal, mechanical action.

As is well-known, it is possible to carry out fermentation of predetermined products in a suitable vessel where the material to be treated is in the form of a liquid with a foam forming at an interior foam region of the vessel which is above the liquid region thereof. The fermentation process is unavoidably accompanied by the undesirable formation of the foam above the liquid. As is well-known, foaming interferes with the desired cell growth, and thus defoaming is essential in order to properly carry out the fermentation process.

It has already been proposed to provide foam breakers where foam will enter into a rotor to be broken and separated by direct action of blades. Such devices are relatively complex and costly and in addition they do not operate with full reliability and with the required efficiency because reliance is made purely on the mechanical direct action on the blades. As a result these known devices can only operate with any degree of effectiveness when there is a predetermined level of the liquid or foam in the fermentation vessel.

It has also been known to use chemical defoamers, such as certain silicons. However, experience has shown that such chemical defoamers also are not satisfactory for their intended purpose because of contamination of sterility, the necessity of extracting the defoamer after processing and possible alteration of the chemical stability of the basic material.

SUMMARY OF THE INVENTION

It is accordingly a primary object of the present invention to provide a defoamer which will avoid the above drawbacks.

In particular, it is an object of the invention to provide a defoamer which does not rely upon chemical action, so that the drawbacks of chemical defoamers are avoided, while at the same time achieving the defoaming action without requiring any particular level of liquid or foam in the fermentation vessel.

In particular, it is an object of the invention to provide a defoamer which does not rely solely upon the mechaical action of blades in order to break up the foam.

More particularly, it is an object of the invention to provide a defoamer which operates by centrifugal, mechanical action to subject the foam to centrifugal force and to impact the foam against an inner surface of the fermentation vessel, so that through these actions the foam is separated into its gaseous and liquid phases.

Also, it is an object of the invention to provide a construction which enables a simple, effective mounting and drive to be provided for the defoaming structure.

In accordance with the invention the vessel in which the fermentation takes place has an inner surface which surrounds and defines a foam region beneath which the vessel has a liquid region. Within the foam region of the vessel is located a rotary impeller means of the invention, and this rotary impeller means coacts with the foam in the foam region to subject the foam to centrifugal action and to impact the foam against the inner surface of the vessel which defines the foam region thereof. As a result of these actions the foam is broken up into its gaseous and liquid phases. The gaseous phase simply escapes upwardly out of the vessel while the liquid phase flows back down to the lower liquid region of the vessel.

BRIEF DESCRIPTION OF DRAWINGS

The invention is illustrated by way of example in the accompanying drawings which form part of this application and in which:

FIG. 1 is a partly schematic and partly fragmentary sectional elevation of an embodiment of a defoamer of the invention shown assembled with additional structure used for fermentation purposes;

FIG. 2 is an upwardly directed plan view of a rotary impeller of the invention taken along line 2—2 of FIG. 1 in the direction of the arrows with a lower impeller plate partly broken away; and FIG. 3 is a sectional elevation taken along line 3—3 of FIG. 2 in the direction of the arrows and showing further details of the rotary impeller of the invention.

DESCRIPTION OF A PREFERRED EMBODIMENT

Referring now to the drawings, FIG. 1 shows in sectional elevation a vessel 10 which is the vessel in which the fermentation process is carried out. The vessel 10 has a lower region 12 forming a liquid region where liquid 15 which is to be treated is located. Above the liquid region 12, the vessel 10 has a foam region 14. This foam region 14 includes an inner surface 16 of the vessel 10 which surrounds and defines a hollow interior space where foam 17 over the liquid 15 is located.

Within the lower liquid region 12 of the vessel 10 is a main rotary impeller 18 which may be of any conventional construction and which has the impeller blades 20 and a central impeller shaft 22 which extends fluid-tightly through the lower end wall 24 of the vessel 10 and which is supported for rotary movement by way of a suitable thrust bearing 26. The shaft 22 is fixed coaxially to and forms an extension of the shaft of the driving motor 28 which is fixed to the vessel 10 by way of the brackets 30. Through this drive means 28 the main impeller 18 can be rotated at a relatively low speed on the order of 500 r.p.m., for example.

The upper end of the vessel 10, which may be made of any suitable metal, for example, carries an outwardly directed annular flange 32 which may be fixed to the vessel 10 as by being welded thereto, for example. This flange 32 serves to fix the top of the vessel over the open top end thereof a headplate 34 which in the illustrated example is made of a metal or plastic which is non-magnetic. Suitable bolt and nut assemblies 36 serve to releasably fasten the headplate 34 to the flange 32 in a position covering the open top end of the vessel 10 and a suitable sealing ring 38 may be located between the flange 32 and headplate 34 in registering grooves thereof, for example.

At its underside which is directed downwardly toward the interior of the vessel 10, the headplate 34 fixedly carries a ring 40 which in turn fixedly carries a hollow cylindrical member 42. This cylindrical member 42 fixedly carries at the region of its lower end a spider 44 in the form of a plurality of arms or rods fixed to and extending radially inwardly from the inner surface of the hollow cylinder 42 and fixedly carrying at their inner ends a bearing sleeve 46.

This bearing sleeve 46 supports for rotary movement an elongated shaft assembly 48 which, as is apparent from FIG. 1, has only a limited possibility of axial displacement with respect to the bearing sleeve 46 while being freely rotatable with respect thereto. The shaft assembly 48 terminates in a lower elongated shaft portion 50.

The shaft 50 extends into a central sleeve 52 of an upper circular impeller plate 54 which is fixed at sleeve 52 with the shaft 50 by way of a cross pin 56. This structure forms part of an impeller means 58 having a lower circular plate 60 parallel to plate 54 and formed with a central suction inlet 62. Beater blades 64 extend radially with respect to the impeller axis and are situated between and fixed to plates 54 and 60 which are perpendicular to the impeller axis. Blades 64 are perpendicular to the impeller plates, have inner inclined ends 66 spaced from the impeller axis and have outer tips 68 situated beyond plates 54 and 60. By extending the blades 64 beyond plates 54 and 60 to the outer tips 68, the final impulse given to the foam is unhampered by horizontal drag which might occur as a result of engagement with the inner surfaces of the plates 54 and 60. In addition, if it should happen that the foam 17 builds up for some unexpected reason at an undesirably rapid rate, the projecting portions of the blades 64 will act mechanically on such unexpectedly rising foam.

In order to drive the rotary impeller means, by rotating it about its axis, the shaft assembly 48 fixedly carries at its top end a substantially flat circular permanent magnet 63. The headplate 34 carries outside of the vessel 10 a driving motor 67 which has a drive shaft fixedly connected with a second permanent magnet 69 which is parallel to the magnet 63 but situated at the opposite outer side of the headplate 34. A cylindrical housing is fixed to the top surface of the headplate 34 and houses the magnet 69 and the drive shaft therefor while carrying the driving motor 67, in the manner indicated in FIG. 1. Thus, the drive will take place through the magnetic members 63 and 69, but it is to be emphasized that if desired a fluid-tight drive extending through the plate 34 could be provided, in the same way, for example, as the mechanical drive from the drive means 28 to the main impeller 18 described above.

It is apparent that the rotary impeller means situated within the upper foam region 14 of the vessel 10 is driven through a drive means 67 which is completely independent of the drive means 28 provided for the main impeller 18. The rotary impeller means 58 of the invention is driven at a relatively high speed on the order of 1500 r.p.m. for example.

In order to provide for escape of the gaseous phase of the foam from the interior of the vessel, a discharge conduit 74 is carried by and extends through the headplate 34 in order to communicate with the interior of the foam region 14 of the vessel 10. This conduit 74 thus extends through an aperture formed in the headplate 34 and has a lower open end directly communicating with the foam region of the vessel. The conduit 74 has an outwardly directed flange 76 which is fixed directly to the plate 34.

The structure described above operates as follows:

During normal fermentation the treated liquid 15 is acted upon by the main rotary impeller 18 which is driven by its independent drive means 28 so as to turn at a relatively low speed on the order of 500 r.p.m., as pointed out above. There will be an unavoidable formation of foam 17 in the upper foam region 14 of the vessel, this foam region being defined by the inner surface 16 of the vessel. The rotary impeller means 58 is driven by way of the drive means 67 and the magnetic transmission at a relatively high speed on the order of 1500 r.p.m., as pointed out above. This rotary impeller means 58 of the invention does not rely primarily upon mechanical breaking of the foam by the beater blades 64. This is immediately apparent from the size of the blades 64 which are relatively narrow so that an effective breaking of the foam by direct mechanical action of the blades 64 on the foam cannot be achieved.

Instead, with the rotary impeller means 48 of the invention the foam is sucked into the impeller through inlet 62 and subjected to centrifugal force to be impacted against the surface 16 which surrounds and defines the foam region 14 in which the rotary impeller means 58 is located, so that both as the result of the centrifugal force and as a result of the impacting against the surface 16 the foam is broken up into its gaseous and liquid phases. The gaseous phase simply escapes out of the top of the vessel, through the discharge conduit 74 while the liquid phase flows back down the inner surface of the vessel to the liquid 15.

It has been found that with this exceedingly simple structure of the invention a highly reliable mechanical defoaming takes place. Thus, all of the disadvantages resulting from chemical defoaming agents are avoided. At the same time since no reliance is made upon mechanical breaking of the foam by direct action of the impeller blades, the structure is not sensitive to any particular level of the liquid and foam within the vessel 10. Films made of the structure during operation thereof show an exceedingly efficient breaking of the foam as a result of the centrifugal force and impacting of the foam against the inner surface of the vessel, rather than as a result of mechanical action directly achieved by the blades 64.

Irrespective of the particular level of the liquid and foam, as long as the impeller means 58 can exert suction on the foam it will be acted upon centrifugally to be thrown outwardly against the inner surface 16 of the foam region 14 of the vessel 10. Breaking up of the foam takes place not only by impact with the surface 16 but also during movement, as a result of the centrifugal force, through the space between the rotary impeller means and the surface 16.

What is claimed is:

1. In a centrifugal, mechanical defoamer, a vessel having a top wall and a foam region where a foam is normally located, said region being defined by an inner surface of said vessel which surrounds said foam region; rotary impeller means situated in said foam region and surrounded by and spaced from said inner surface of said vessel; first drive means outside of said vessel; means operatively coupling said first drive means and impeller means for rotating said impeller means at a speed sufficient to centrifugally act on foam in said foam region to subject the foam to centrifugal force and to impact the foam against said inner surface of said vessel to break up the foam into a liquid phase which returns to a lower liquid region of the vessel and a gaseous phase which escapes from the interior of the vessel by a separate vent, said rotary impeller means having an axis coinciding with the axis of rotation of said impeller means and consisting of upper and lower parallel plates perpendicular to said impeller axis and a plurality of beater blades extending between and fixed to said plates, said blades extending radially with respect to said impeller axis and said lower plate being formed at the impeller axis with a suction inlet communicating directly with the interior of said foam region, said coupling means having magnetic portions situated adjacent opposed surfaces of said top wall and respectively operably coupled to said drive means and rotary impeller means, said top wall being made of a nonmagnetic material so that the drive can be transmitted from said drive means to said impeller means through said top wall; main impeller means situated in a lower, liquid region of said vessel; and second drive means independent of said first drive means and operatively coupled to said main impeller means to drive same.

2. The combination of claim 1 and wherein said vessel has an open top, a headplate carried by said vessel and covering said open top thereof, and a gas-discharge conduit, connected to and extending through said headplate to communicate with the interior of the vessel at said foam region thereof, for providing said separate vent for the gaseous phase of the foam.

3. The combination of claim 2 and wherein said headplate supports said rotary impeller means and first drive means for rotary movement.

4. The combination of claim 1 wherein the inner edges of said blades are respectively spaced from, and situated in planes which contain, the impeller axis.

5. The combination of claim 4 wherein said blades of the outer peripheries of said rotary impeller means extend beyond said plates.

References Cited

UNITED STATES PATENTS

| | | | |
|---|---|---|---|
| 2,401,469 | 6/1946 | Edwards | 252—361 X |
| 2,610,155 | 9/1952 | Humfeld et al. | 55—178 |
| 2,880,979 | 4/1959 | Wheeler | 261—84 |
| 3,080,303 | 3/1963 | Nerheim | 202—153 |
| 3,250,687 | 5/1966 | Frank | 202—205 X |
| 3,317,435 | 5/1967 | Yamashita et al. | 195—107 X |
| 3,249,554 | 5/1966 | Diamant et al. | 252—361 |
| 2,564,765 | 8/1951 | Mercier | 252—361 |

NORMAN YUDKOFF, Primary Examiner

J. SOFER, Assistant Examiner

U.S. Cl. X.R.

159—Dig. 4, Dig. 7; 55—78